(12) United States Patent  
Huang

(10) Patent No.: US 11,371,154 B2
(45) Date of Patent: Jun. 28, 2022

(54) METHODS AND SYSTEMS FOR ELECTROCHEMICAL ADDITIVE MANUFACTURING

(71) Applicant: THE BOARD OF TRUSTEES OF THE UNIVERSITY OF ALABAMA, Tuscaloosa, AL (US)

(72) Inventor: Qiang Huang, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 17/223,809

(22) Filed: Apr. 6, 2021

(65) Prior Publication Data
US 2021/0301413 A1    Sep. 30, 2021

Related U.S. Application Data

(62) Division of application No. 16/039,510, filed on Jul. 19, 2018, now Pat. No. 11,008,664.

(60) Provisional application No. 62/534,869, filed on Jul. 20, 2017.

(51) Int. Cl.
| | | |
|---|---|---|
| *C25D 1/00* | (2006.01) | |
| *B33Y 30/00* | (2015.01) | |
| *B33Y 10/00* | (2015.01) | |
| *C25D 15/00* | (2006.01) | |

(52) U.S. Cl.
CPC .............. *C25D 1/003* (2013.01); *B33Y 10/00* (2014.12); *B33Y 30/00* (2014.12); *C25D 15/00* (2013.01)

(58) Field of Classification Search
None
See application file for complete search history.

(56) References Cited

U.S. PATENT DOCUMENTS

| 5,641,391 A | 6/1997 | Hunter et al. |
| 2006/0042953 A1 | 3/2006 | Ramarajan et al. |
| 2007/0089993 A1 | 4/2007 | Schwartz et al. |
| 2007/0199826 A1 | 8/2007 | Son et al. |
| 2008/0107805 A1* | 5/2008 | Palumbo ................ A63B 59/50 427/181 |
| 2015/0299891 A1 | 10/2015 | Buckalew |

(Continued)

FOREIGN PATENT DOCUMENTS

WO    2016036607 A1    3/2016

OTHER PUBLICATIONS

Abbasi, et al., "Electrodeposition modeling and optimization to improve thin film patterning with orchestrated structure evolution", Nanotechnology, 2012, 23(30), 305301.

(Continued)

*Primary Examiner* — Stefanie S Wittenberg
(74) *Attorney, Agent, or Firm* — Meunier Carlin & Curfman LLC

(57) ABSTRACT

Methods and systems for producing a three-dimensional structure using electrochemical additive manufacturing are described herein. The methods can comprise injecting a growth control solution into an electrolyte comprising a metal salt to form a growth control region and applying an electric potential to a working electrode to thereby form a layer of metal at a location defined by the growth control region. The injecting and applying steps of the methods can be repeated for form the three-dimensional structure on a layer-by-layer basis.

15 Claims, 9 Drawing Sheets

(56) References Cited

U.S. PATENT DOCUMENTS

2017/0044680 A1  2/2017  Sundaram
2017/0145584 A1  5/2017  Wirth et al.

OTHER PUBLICATIONS

Abbasi, et al., "Orchestrated structure evolution: modeling growth-regulated nanomanufacturing", Nanotechnology, 2011, 22(16), 165303.
Ahn, et al., "Omnidirectional printing of flexible, stretchable, and spanning silver microelectrodes", Science, 2009, 323(5921), 1590.
Akolkar, et al., "A Time-Dependent Transport-Kinetics Model for Additive Interactions in Copper Interconnect Metallization", Journal of The Electrochemical Society, 2004, 151, C702.
Berman, , "3-D printing: The new industrial revolution", Business horizons, 2012, 55(2), 155.
Brant, et al., "A Novel Electrochmical Micro Additive Manufacturing Method of Overhanging Metal Parts Without Reliance on Support Structures", Procedia Manufacturing, 2016, 5, 928-943.
Braun, et al., "Localized Electrodeposition and Patterning Using Bipolar Electrochemistry", Journal of the Electrochemical Society, 2015, 162(4), D180.
Broekmann, et al., "Classification of suppressor additives based on synergistic and antagonistic ensemble effects", Electrochimica Acta, 2011, 56(13), 4724.
Chai, et al., "Mechanical properties of carbon nanotube—copper nanocomposites", Journal of Micromechanics and Microengineering, 2008, 18(3), 035013.
Chang, et al., "Surface and transverse morphology of micrometer nickel columns fabricated by localized electrochemical deposition", Journal of Micromechanics and Microengineering, 2007, 17(11), 2336.
Chu, et al., "On the thermal expansion of CNT/Cu composites for electronic packaging applications", Applied Physics A, 2013, 111(2), 439.
El-Giar, et al., "Localized Electrochemical Deposition of Copper Microstructures", J. Electrochemical Soc, 2000, 147(2), 586-591.
Frazier, et al., "Metal additive manufacturing: a review", Journal of Materials Engineering and Performance, 2014, 23, 1917.
Habib, et al., "Analysis of electrolyte flow in localized electrochemical deposition", Procedia Engineering, 2013, 56, 766-771.
Hayase, et al., "Copper Bottom-up Deposition by Breakdown of PEG-CI Inhibition", Electrochemical and Solid-State Letters, 2002, 5, C98.
Healy, et al., "The Chemistry of the Additives in an Acid Copper Electroplating Bath. I. Polyethylene Glycol and Chloride Ion", Journal of Electroanalytical Chemistry, 1992, 338(1), 155.
Hebert, , "Role of Chloride Ions in Suppression of Copper Electrodeposition by Polyethylene Glycol", Journal of The Electrochemical Society, 2005, 152(5), C283-C287.
Hirt, et al., "Template-Free 3D Microprinting of Metals Using a Force-Controlled Nanopipette for Layer-by-Layer Electrodeposition", Advanced Materials, 2016, 28(12), 2311.
Hu, et al., "Meniscus-confined three-dimensional electrodeposition for direct writing of wire bonds", Science, 2010, 329(5989), 313.
Huang, et al., "Electrodeposition of Cobalt for Interconnect Application Effect of Dimethylglyoxime", Journal of The Electrochemical Society, 2016, 163(13), D715.
Huang, et al., "Electrodeposition of FeCoNiCu nanowires", Journal of applied electrochemistry, 2006, 36(8), 871.
Jansson, et al., "High resolution 3D microstructures made by localized electrodeposition of nickel.", Journal of The Electrochemical Society, 2000, 147(5), 1810.
Josell, et al., "Superconformal Bottom-up Cobalt Deposition in High Aspect Ratio through Silicon Vias", Journal of The Electrochemical Society, 2016, 163(14), D809.
Josell, et al., "Superconformal Bottom-Up Nickel Deposition in High Aspect Ratio Through Silicon Vias", Journal of The Electrochemical Society, 2016, 163(7), D322.
Kamaraj, et al., "Numberical Study of Localized Electrochemical Deposition for Micro Electrochemical Additive Manufacturing", Procedia CIRP, 2016, 42, 788-792.
Kelly, et al., "Copper Deposition in the Presence of Polyethylene Glycol—II. Electrochemical Impedance Study", Journal of The Electrochemical Society, 1998, 145, 3477.
Kelly, et al., "Copper Deposition in the Presence of Polyethylene Glycol—I. Quartz Crystal Microbalance Study", Journal of The Electrochemical Society, 1998, 145, 3472.
Kim, et al., "Electrodeposition of Cu in the PEI-PEG-CI-SPS Additive System", Journal of The Electrochemical Society, 2006, 153, C616.
Kim, , "Electrodeposition of Ni in Submicrometer Trenches", Journal of The Electrochemical Society, 2007, 154, D443.
Kitayaporn, et al., "Orchestrated structure evolution: accelerating direct-write nanomanufacturing by combining top-down patterning with bottom-upgrowth", Nanotechnology, 2010, 21(19), 195306.
Lee, et al., "Localized electrochemical deposition process improvement by using different anodes and deposition directions", Journal of Micromechanics and Microengineering, 2008, 18(10), 105008.
Levy, et al., "Rapid manufacturing and rapid tooling with layer manufacturing (LM) technologies, state of the art and future perspectives", CIRP Annals-Manufacturing Technology, 2003, 52(2), 589.
Liang, et al., "Electroplating of Fe-Rich NiFe Alloys in Sub-50 nm Lines", Journal of the Electrochemical Society, 2014, 161(5), D30-D308.
Lin, et al., "Localized electrochemical deposition of micrometer copper columns", Electrochimica Acta, 2010, 55, 1888-1894.
Long, et al., "Electrochemical Characterization of Adsorption-Desorption of the Cuprous-Suppressor-Chloride Complex during Electrodeposition of Copper", J. Eletrochemical Soc., 2006, 152(4), C258-C264.
Madden, et al., "Three-Dimensional Microfabrication by Localized Electrochemical Deposition", J. Microeletromechanical systems, 1996, 5(1), 24-32.
Mahajan, et al., "Studies on the thermal decomposition of multiwall carbon nanotubes under different atmospheres", Materials Letters, 2013, 90, 165.
Malshe, et al., "Tip-based nanomanufacturing by electrical, chemical, mechanical and thermal processes", Cirp Annals-Manufacturing Technology, 2010, 59(2), 628.
Romankiw, , "A path: from electroplating through lithographic masks in electronics to LIGA in MEMS", Electrochimica Acta, 1997, 42, 2985.
Roy, , "Fabrication of micro- and nano-structured materials using mask-less processes", Journal of Physics D-Applied Physics, 2007, 40(22), R413.
Scott, et al., "The Fabrication of Freestanding Heterogeneous Copper-Tin Films with Meniscus Brush Plating Electrodeposition", Journal of New Materials for Electrochemical Systems, 2015, 18(1), 25.
Seol, et al., "Electrodeposition-based 3D Printing of Metallic Microarchitectures with Controlled Internal Structures", Small, 2015, 11(32), 3896.
Subramaniam, et al., "One hundred fold increase in current carrying capacity in a carbon nanotube-copper composite", Nature communications, 2013, 4, 2202.
Sundaram, et al., "Mask-Less Electrochemical Additive Manufacturing: A Feasibility Study", Journal of Manufacturing Science and Engineering—Transactions of the Asme, 2015, 137(2), 021006.
Tang, et al., "Enhanced thermal stability in graphene oxide covalently functionalized with 2-amino-4,6-didodecylamino-1,3,5-triazine", Carbon, 2011, 49(4), 1258.
Wei, et al., "Electrochemical depostition of layered copper thin films based on the diffusion limited aggregation", Scientific reports, 2016, 6, 34779.
West, et al., "Controlling Copper Electrochemical Deposition (ECD)", AIP Conference Proceedings, 2003, 683, 504-513.
Whitaker, et al., "Electrochemical printing: software reconfigurable electrochemical microfabrication", Journal of Micromechanics and Microengineering, 2005, 15(8), 1498.

* cited by examiner

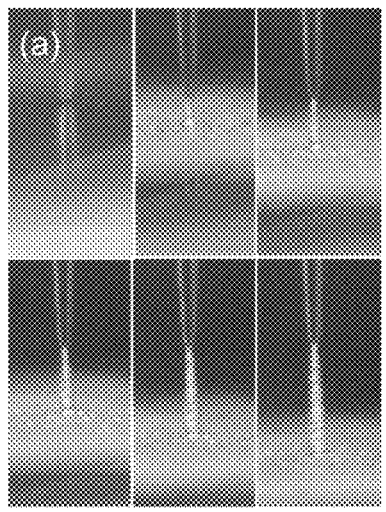 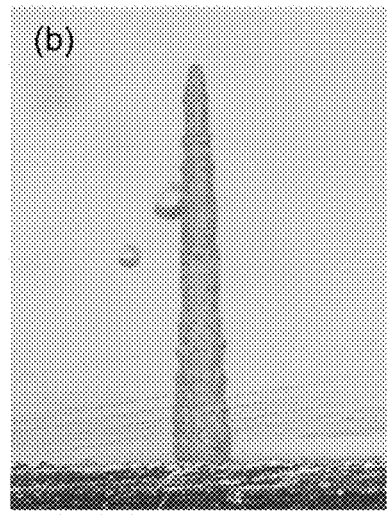 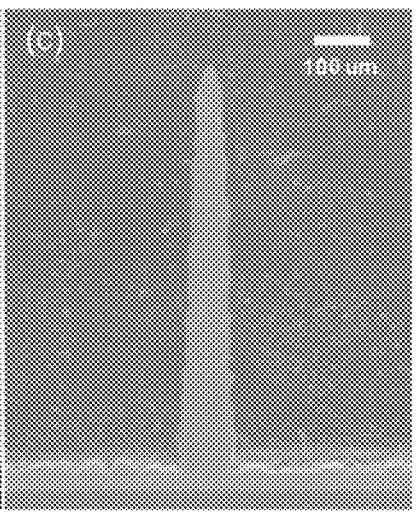
*FIG. 9A*     *FIG. 9B*     *FIG. 9C*
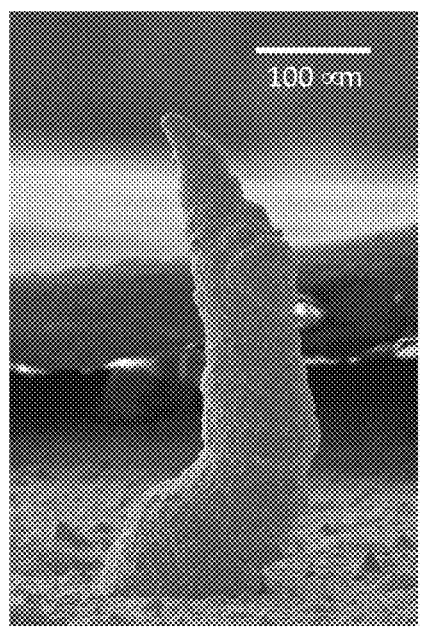
*FIG. 10*

METHODS AND SYSTEMS FOR ELECTROCHEMICAL ADDITIVE MANUFACTURING

CROSS-REFERENCE TO RELATED APPLICATIONS

This application is a division of U.S. application Ser. No. 16/039,510 filed Jul. 19, 2018, which claims the benefit of priority to U.S. Provisional Application 62/534,869, filed Jul. 20, 2017, both of which are hereby incorporated herein by reference in their entireties.

BACKGROUND

Additive manufacturing is a new technique of making structures by directly building the materials bottom-up instead of subtractively removing the unwanted materials (machining, top-down). It is also called 3D printing because a 3-dimensional structure is typically built in a layer-by-layer fashion, where each layer represents a 2-dimensional cross-sectional slice of the final structure. Since its invention, this technique has reshaped the perception of how an object can be made.

3D printers based on extrusion of low melting point materials such as polymers have been widely adopted for a variety of potential applications, such as prototyping. On the other hand, 3D printing of metals and alloys are of great interest for applications in electronics, biomedical devices as well as aerospace and defense industry. The state-of-the-art metal 3D printing is based on a powder bed, where a layer of metal powders is laid down (Levy G N et al. CIRP Annals-Manufacturing Technology, 2003, 52(2), 589). Focused laser beams or other highly energetic means are used to selectively melt or sinter the powders, which are converted into the 2-dimensional slices of the final object.

In addition to high energy cost and metal oxidation at high temperature, this process faces great challenges when nanostructured materials are needed. For example, the intermixing of materials prevents the formation of nanomaterials with distinct layers. In addition, polymers and other carbon based materials often suffer poor stability at the melting points of metals (Mahajan A et al. Materials Letters, 2013, 90, 165; Tang XZ et al. Carbon, 2011, 49(4), 1258), preventing the formation of composite materials with polymers, carbon nanotubes (CNT) or graphene dispersed in metal matrix. On the other hand, such materials can be of great interest for their unique properties resulted from the combination of different components. Methods and systems that can form such composite materials are needed. The methods discussed herein address these and other needs.

SUMMARY

In accordance with the purposes of the disclosed systems and methods, as embodied and broadly described herein, the disclosed subject matter relates to systems and methods for electrochemical additive manufacturing.

Additional advantages of the disclosed systems and methods will be set forth in part in the description which follows, and in part will be obvious from the description. The advantages of the disclosed systems and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

(FIG. 8A) Diagram of the relative positions of the three locations around the pillar and the simulated normalized concentration transient profiled at the center of pillar top, corner of pillar top, and foot of pillar when a 0-concentration electrolyte is injected into a full concentration electrolyte through a 15 μm diameter nozzle placed above a 20 μm gap across a 20 μm wide 50 μm tall pillar at an injection rate of (FIG. 8B) 4.2 nL/min, (FIG. 8C) 21 nL/min, (FIG. 8D) 42 nL/min, (FIG. 8E) 84 nL/min, and (FIG. 8F) 420 nL/min.

FIG. 9A-FIG. 9C: (FIG. 9A) In situ observation of the growth of a copper pillar upon the injection of $Cl^-$-free electrolyte into an electrolyte with 30 ppm $Cl^-$, and the (FIG. 9B) optical observation and (FIG. 9C) cross sectional SEM observation of the pillar.

FIG. 10 is an image of an example three-dimensional structure fabricated using the electrochemical additive manufacturing methods described herein.

DETAILED DESCRIPTION

Figure 1:
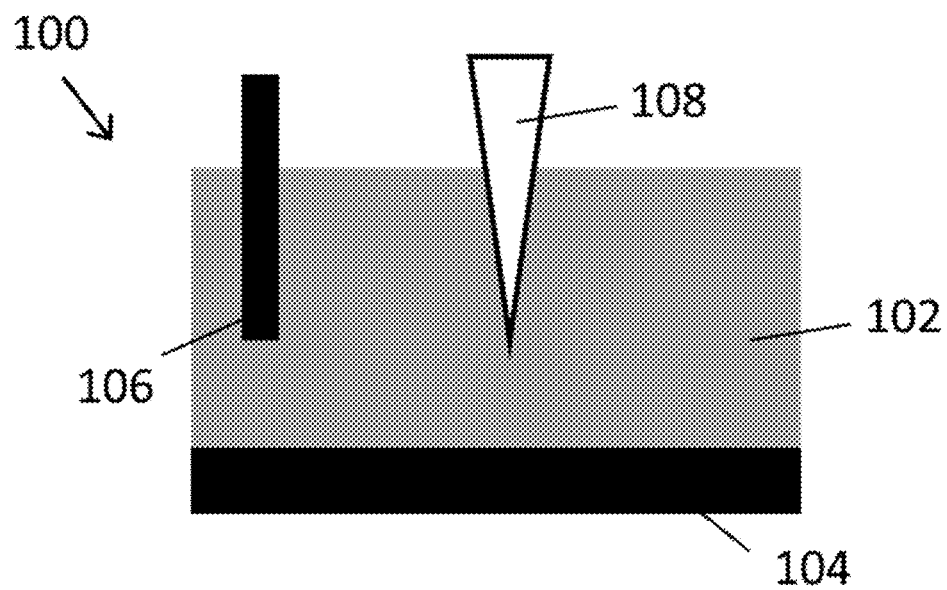
FIG. 1 is a schematic of an exemplary system as disclosed herein.

The methods described herein may be understood more readily by reference to the following detailed description of specific aspects of the disclosed subject matter and the Examples included therein.

Before the present methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Disclosed herein are systems and methods for producing three-dimensional structures using electrochemical additive manufacturing. For example, the methods can comprise locally controlled electrochemical additive manufacturing, wherein the methods are locally controlled via growth control regions formed by injecting a growth control solution.

The methods can comprise injecting a growth control solution into an electrolyte at a first location proximate a working electrode. As used herein, "a first location" and "the first location" are meant to include any number of locations in any arrangement in the electrolyte. Thus, for example "a first location" includes one or more first locations. In some embodiments, the first location can comprise a plurality of locations. In some embodiments, the first locations can comprise a plurality of locations arranged in an ordered array.

The electrolyte is in electrochemical contact with the working electrode and a counter electrode.

The working electrode and the counter electrode can comprise any conducting material consistent with the methods and systems described herein. Appropriate materials for working electrodes and counter electrodes are well known in the art.

For example, the working electrode and/or the counter electrode can comprise(s) a transparent conducting oxide, a conducting polymer, a carbon material, a metal, or a combination thereof. The metal can, for example, be selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. Examples of carbon materials include, but are not limited to, graphitic carbon and graphites, including pyrolytic graphite (e.g., highly ordered pyrolytic graphite (HOPG)) and isotropic graphite, amorphous carbon, carbon black, single- or multi-walled carbon nanotubes, graphene, glassy carbon, diamond-like carbon (DLC) or doped DLC, such as boron-doped diamond, pyrolyzed photoresist films, and others known in the art.

The electrolyte can comprise a first metal salt. In some examples, the first metal salt can comprise a first metal selected from the group consisting of Cu, Au, Pd, Ag, Fe, Ni, Co, In, or a combination thereof. In some examples, the first metal salt comprises $CuSO_4$.

The concentration of the first metal salt in the electrolyte can, for example, be 0.001 moles per liter (molar, mol/L, M) or more (e.g., 0.0025 M or more, 0.005 M or more, 0.0075 M or more, 0.01 M or more, 0.025 M or more, 0.05 M or more, 0.075 M or more, 0.1 M or more, 0.25 M or more, 0.5 M or more, 0.75 M or more, 1 M or more, 2.5 M or more, 5 M or more, or 7.5 M or more). In some examples, the concentration of the first metal salt in the electrolyte can be 10 M or less (e.g., 7.5 M or less, 5 M or less, 2.5 M or less, 1 M or less, 0.75 M or less, 0.5 M or less, 0.25 M or less, 0.1 M or less, 0.075 M or less, 0.05 M or less, 0.025 M or less, 0.01 M or less, 0.0075 M or less, or 0.005 M or less). The concentration of the first metal salt in the electrolyte can range from any of the minimum values described above to any of the maximum values described above. For example, the concentration of the first metal salt in the electrolyte can be from 0.001 M to 10 M (e.g., 0.001 M to 0.01 M, from 0.01 M to 0.1 M, 0.1 M to 1 M, from 1 M to 10 M, from 0.05 M to 5 M, from 0.5 M to 0.75 M).

In some examples, the electrolyte can further comprise a suppressor. As used herein, a suppressor is a material that can suppress the electrodeposition of the first metal from the first metal salt. Examples of suppressors include, but are not limited to, nitrogen containing compounds, sulfur containing compounds, complexing agents, and chelating agents. The suppressor can be selected based on the identity of the first metal salt in the electrolyte. In some examples, the suppressor can comprise chloride, polyalkylene glycols (e.g., polyethylene glycol (PEG), polypropylene glycol (PPG)), polyethyleneimine (PEI), saccharin, ammonium hydroxide, cetyl-trimethyl-ammonium, dimethylglyoxime, cyclohexane dioxime, potassium ferrocyanide, citric acid, tartaric acid, ethylene diamine, ethylene-diamine-tetraacetic acid, and combinations thereof. In some examples, the first metal salt comprises a copper salt and the suppressor comprises chloride, polyalkylene glycols (e.g., polyethylene glycol (PEG), polypropylene glycol (PPG)), ammonium hydroxide, or a combination thereof. In some examples, the first metal salt comprises a nickel salt, an iron salt, or a combination thereof and the suppressor comprises polyethyleneimine (PEI), saccharin, cetyl-trimethyl-ammonium, ammonium hydroxide, citric acid, potassium ferrocyanide, or a combination thereof. In some examples, the first metal salt comprises a cobalt salt and the suppressor comprises polyethyleneimine (PEI), dimethylglyoxime, cyclohexane dioxime, or a combination thereof.

The concentration of the suppressor in the electrolyte can, for example, be 0.1 parts per million (ppm) or more (e.g., 0.5 ppm or more, 1 ppm or more, 5 ppm or more, 10 ppm or more, 15 ppm, 20 ppm or more, 25 ppm, 30 ppm or more, 35 ppm, 40 ppm or more, 45 ppm or more, 50 ppm or more, 60 ppm or more, 70 ppm or more, 80 ppm or more, 90 ppm or more, 100 ppm or more, 150 ppm or more, 200 ppm or more, 250 ppm or more, 300 ppm or more, 350 ppm or more, 400 ppm or more, 450 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 3000 ppm or more, 4000 ppm or more, 5000 ppm or more, or 7500 ppm or more). In some examples, the concentration of the suppressor in the electrolyte can be 10,000 ppm or less (e.g., 7500 ppm or less, 5000 ppm or less, 4000 ppm or less, 3000 ppm or less, 2000 ppm or less, 1750 ppm or less, 1500 ppm or less, 1250 ppm or less, 1000 ppm or less, 900 ppm or less, 800 ppm or less, 700 ppm or less, 600 ppm or less, 500 ppm or less, 450 ppm or less, 400 ppm or less, 350 ppm or less, 300 ppm or less, 250 ppm or less, 200 ppm or less, 150 ppm or less, 100 ppm or less, 90 ppm or less, 80 ppm or less, 70 ppm or less, 60 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, or 1 ppm or less). The concentration of the suppressor in the electrolyte can range from any of the minimum values described above to any of the maximum values described above. For example, the concentration of the suppressor in the electrolyte can be from 0.1 ppm to 10,000 ppm (e.g., from 0.1 ppm to 1 ppm, from 1 ppm to 100 ppm, from 100 ppm to 1000 ppm, from 1000 ppm to 10000 ppm, from 1 ppm to 1000 ppm, from 10 ppm to 500 ppm, from 10 ppm to 40 ppm, from 20 ppm to 40 ppm, from 25 ppm to 35 ppm, from 100 ppm to 400 ppm, or from 200 ppm to 400 ppm, or from 250 ppm to 250 ppm).

In some examples, the electrolyte can further comprise an accelerator. As used herein, an accelerator is a material that can accelerate the electrodeposition of the first metal from the first metal salt and/or a material that can offset the suppression effect of a suppressor on the electrodeposition of the first metal from the first metal salt. Examples of accelerators include, but are not limited to, potassium thiocyanate (KSCN), KSeCN, thiourea (TU), mercapto-bezoaxazole (MBX), benzene sulfinic acid, bis(3-sulfopropyl) disulfide, 2-mercaptoethane-sulfonic acids, 3-mercapto-2-propane sulfonic acid, dimercaptopropionyl sulfonic acid, dimercaptoethane sulfonic acid, and combinations thereof. In some examples, the first metal salt comprises a silver salt and the accelerator comprises KSeCN. In some examples, the first metal salt comprises an iron salt, a nickel salt, or a combination thereof and the accelerator comprises thiourea (TU), mercapto-bezoaxazole (MBX), benzene sulfinic acid, or a combination thereof. In some examples, the first metal salt comprises a copper salt and the accelerator comprises bis(3-sulfopropyl) disulfide, 2-mercaptoethane-sulfonic acids, 3-mercapto-2-propane sulfonic acid, dimercaptopropionyl sulfonic acid, dimercaptoethane sulfonic acid, or a combination thereof.

In some examples, the electrolyte can further comprise a solvent. Examples of suitable solvents include, but are not limited to, water, ethanol, isopropanol, and combinations thereof.

The growth control solution can, in some examples, comprise a second metal salt. For example, second metal salt can comprise a second metal selected from the group consisting of Cu, Au, Pd, Ag, Fe, Ni, Co, In, or a combination thereof. In some examples, the second metal salt can comprise $CuSO_4$. In some examples, the growth control solution can comprise a second metal salt comprising a second metal and the electrolyte can comprise a first metal salt comprising a first metal, wherein the first metal and the second metal are the same metal. In some examples, the growth control solution and the electrolyte can comprise the same metal salt (e.g., the first metal salt and the second metal salt are the same).

The concentration of the second metal salt in the growth control solution can, for example, be 0.001 moles per liter (molar, mol/L, M) or more (e.g., 0.0025 M or more, 0.005 M or more, 0.0075 M or more, 0.01 M or more, 0.025 M or more, 0.05 M or more, 0.075 M or more, 0.1 M or more, 0.25 M or more, 0.5 M or more, 0.75 M or more, 1 M or more, 2.5 M or more, 5 M or more, or 7.5 M or more). In some examples, the concentration of the second metal salt in the growth control solution can be 10 M or less (e.g., 7.5 M or less, 5 M or less, 2.5 M or less, 1 M or less, 0.75 M or less, 0.5 M or less, 0.25 M or less, 0.1 M or less, 0.075 M or less, 0.05 M or less, 0.025 M or less, 0.01 M or less, 0.0075 M or less, or 0.005 M or less). The concentration of the second metal salt in the growth control solution can range from any of the minimum values described above to any of the maximum values described above. For example, the concentration of the second metal salt in the growth control solution can be from 0.001 M to 10 M (e.g., 0.001 M to 0.01 M, from 0.01 M to 0.1 M, 0.1 M to 1 M, from 1 M to 10 M, or from 0.05 M to 5 M). In certain examples, the concentration of the second metal salt in the growth control solution can be the same as the concentration of the first metal salt in the electrolyte. In certain examples, the concentration of the second metal salt in the growth control solution can be different than the concentration of the first metal salt in the electrolyte.

In some examples, the growth control solution does not comprise a suppressor when the electrolyte comprises a suppressor. In some examples, the growth control solution can comprise a suppressor. In some examples, the growth control solution can comprise a suppressor when the electrolyte does not include a suppressor. Examples of suppressors include, but are not limited to, nitrogen containing compounds, sulfur containing compounds, complexing agents, and chelating agents. The suppressor can be selected based on the identity of the first metal salt in the electrolyte. In some examples, the suppressor can comprise chloride, polyalkylene glycols (e.g., polyethylene glycol (PEG), polypropylene glycol (PPG)), polyethyleneimine (PEI), saccharin, ammonium hydroxide, cetyl-trimethyl-ammonium, dimethylglyoxime, cyclohexane dioxime, potassium ferrocyanide, citric acid, tartaric acid, ethylene diamine, ethylene-diamine-tetraacetic acid, and combinations thereof. In some examples, the first metal salt in the electrolyte comprises a copper salt and the suppressor in the growth control solution comprises chloride, polyalkylene glycols (e.g., polyethylene glycol (PEG), polypropylene glycol (PPG)), ammonium hydroxide, or a combination thereof. In some examples, the first metal salt in the electrolyte comprises a nickel salt, an iron salt, or a combination thereof and the suppressor in the growth solution comprises polyethyleneimine (PEI), saccharin, cetyl-trimethyl-ammonium, ammonium hydroxide, citric acid, potassium ferrocyanide, or a combination thereof. In some examples, the first metal salt in the electrolyte comprises a cobalt salt and the suppressor in the growth control solution comprises polyethyleneimine (PEI), dimethylglyoxime, cyclohexane dioxime, or a combination thereof.

The concentration of the suppressor in the growth control solution can, for example, be 1 ppm or more (e.g., 2 ppm or more, 3 ppm or more, 4 ppm or more, 5 ppm or more, 10 ppm or more, 15 ppm, 20 ppm or more, 25 ppm or more, 30 ppm or more, 35 ppm, 40 ppm or more, 45 ppm or more, 50 ppm or more, 60 ppm or more, 70 ppm or more, 80 ppm or more, 90 ppm or more, 100 ppm or more, 150 ppm or more, 200 ppm or more, 250 ppm or more, 300 ppm or more, 350 ppm or more, 400 ppm or more, 450 ppm or more, 500 ppm or more, 600 ppm or more, 700 ppm or more, 800 ppm or more, or 900 ppm or more). In some examples, the concentration of the suppressor in the growth control solution can be 1000 ppm or less (e.g., 900 ppm or less, 800 ppm or less, 700 ppm or less, 600 ppm or less, 500 ppm or less, 450 ppm or less, 400 ppm or less, 350 ppm or less, 300 ppm or less, 250 ppm or less, 200 ppm or less, 150 ppm or less, 100 ppm or less, 90 ppm or less, 80 ppm or less, 70 ppm or less, 60 ppm or less, 50 ppm or less, 45 ppm or less, 40 ppm or less, 35 ppm or less, 30 ppm or less, 25 ppm or less, 20 ppm or less, 15 ppm or less, 10 ppm or less, or 5 ppm or less). The concentration of the suppressor in the growth control solution can range from any of the minimum values described above to any of the maximum values described above. For example, the concentration of the suppressor in the electrolyte can be from 1 ppm to 1000 ppm (e.g., from 1 ppm to 500 ppm, from 500 ppm to 1000 ppm, from 1 ppm to 200 ppm, from 200 ppm to 400 ppm, from 400 ppm to 600 ppm, from 600 ppm to 800 ppm, from 800 ppm to 1000 ppm, from 1 ppm to 100 ppm, from 100 ppm to 1000 ppm, from 10 ppm to 500 ppm, from 10 ppm to 40 ppm, from 20 ppm to 40 ppm, from 25 ppm to 35 ppm, from 100 ppm to 400 ppm, or from 200 ppm to 400 ppm, or from 250 ppm to 250 ppm).

In some examples, the growth control solution can further comprise an accelerator. In some examples, the growth control solution can comprise an accelerator when the electrolyte does not include an accelerator. Examples of accelerators include, but are not limited to, potassium thiocyanate (KSCN), KSeCN, thiourea (TU), mercapto-bezoaxazole (MBX), benzene sulfinic acid, bis(3-sulfopropyl) disulfide, 2-mercaptoethane-sulfonic acids, 3-mercapto-2-propane sulfonic acid, dimercaptopropionyl sulfonic acid, dimercaptoethane sulfonic acid, and combinations thereof. In some examples, the first metal salt in the electrolyte comprises a silver salt and the accelerator in the growth control solution comprises KSeCN. In some examples, the first metal salt in the electrolyte comprises an iron salt, a nickel salt, or a combination thereof and the accelerator in the growth control solution comprises thiourea (TU), mercapto-bezoaxazole (MBX), benzene sulfinic acid, or a combination thereof. In some examples, the first metal salt in the electrolyte comprises a copper salt and the accelerator in the growth control solution comprises bis(3-sulfopropyl) disulfide, 2-mercaptoethane-sulfonic acids, 3-mercapto-2-propane sulfonic acid, dimercaptopropionyl sulfonic acid, dimercaptoethane sulfonic acid, or a combination thereof.

The concentration of the accelerator in the growth control solution can, for example, be 0.1 ppm or more (e.g., 0.5 ppm or more, 1 ppm or more, 2 ppm or more, 3 ppm or more, 4 ppm or more, 5 ppm or more, 10 ppm or more, 15 ppm, 20 ppm or more, 25 ppm, 30 ppm or more, 35 ppm, 40 ppm or more, 45 ppm or more, 50 ppm or more, 60 ppm or more, 70 ppm or more, 80 ppm or more, 90 ppm or more, 100 ppm or more, 150 ppm or more, 200 ppm or more, 250 ppm or more, 300 ppm or more, 350 ppm or more, 400 ppm or more, 450 ppm or more, 500 ppm or more, 600 ppm or more, 700 ppm or more, 800 ppm or more, or 900 ppm or more). In some examples, the concentration of the accelerator in the growth control solution can be 1000 ppm or less (e.g., 900 ppm or less, 800 ppm or less, 700 ppm or less, 600 ppm or less, 500 ppm or less, 450 ppm or less, 400 ppm or less, 350 ppm or less, 300 ppm or less, 250 ppm or less, 200 ppm or less, 150 ppm or less, 100 ppm or less, 90 ppm or less, 80 ppm or less, 70 ppm or less, 60 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, or 1 ppm or less). The concentration of the accelerator in the growth control solution can range from any of the minimum values described above to any of the maximum values described above. For example, the concentration of the accelerator in the electrolyte can be from 0.1 ppm to 1000 ppm (e.g., from 0.1 ppm to 500 ppm, from 500 ppm to 1000 ppm, from 0.1 ppm to 200 ppm, from 200 ppm to 400 ppm, from 400 ppm to 600 ppm, from 600 ppm to 800 ppm, from 800 ppm to 1000 ppm, from 1 ppm to 100 ppm, from 100 ppm to 1000 ppm, from 10 ppm to 500 ppm, from 10 ppm to 40 ppm, from 20 ppm to 40 ppm, from 25 ppm to 35 ppm, from 100 ppm to 400 ppm, or from 200 ppm to 400 ppm, or from 250 ppm to 250 ppm).

In some examples, the growth control solution can further comprise a solvent. Examples of suitable solvents include, but are not limited to, water, ethanol, isopropanol, and combinations thereof.

The growth control solution can, for example, be injected at an injection rate of 1 picoliter per minute (pL/min) or more (e.g., 2 pL/min or more, 3 pL/min or more, 4 pL/min or more, 5 pL/min or more, 10 pL/min or more, 15 pL/min or more, 20 pL/min or more, 30 pL/min or more, 40 pL/min or more, 50 pL/min or more, 100 pL/min or more, 150 pL/min or more, 200 pL/min or more, 300 pL/min or more, 400 pL/min or more, 500 pL/min or more, 750 pL/min or more, 1 nanoliter per minute (nL/min) or more, 2 nL/min or more, 3 nL/min or more, 4 nL/min or more, 5 nL/min or more, 10 nL/min or more, 15 nL/min or more, 20 nL/min or more, 25 nL/min or more, 30 nL/min or more, 35 nL/min or more, 40 nL/min or more, 45 nL/min or more, 50 nL/min or more, 60 nL/min or more, 70 nL/min or more, 80 nL/min or more, 90 nL/min or more, 100 nL/min or more, 120 nL/min or more, 140 nL/min or more, 160 nL/min or more, 180 nL/min or more, 200 nL/min or more, 220 nL/min or more, 240 nL/min or more, 260 nL/min or more, 280 nL/min or more, 300 nL/min or more, 320 nL/min or more, 340 nL/min or more, 360 nL/min or more, 380 nL/min or more, 400 nL/min or more, 420 nL/min or more, 440 nL/min or more, 460 nL/min or more, 480 nL/min or more, 500 nL/min or more, 550 nL/min or more, 600 nL/min or more, 650 nL/min or more, 700 nL/min or more, 750 nL/min or more, 800 nL/min or more, 850 nL/min or more, 900 nL/min or more, 950 nL/min or more, 1 microliter per minute (μL/min) or more, 2 μL/min or more, 3 μL/min or more, 4 μL/min or more, 5 μL/min or more, 10 μL/min or more, 15 μL/min or more, 20 μL/min or more, 30 μL/min or more, 40 μL/min or more, 50 μL/min or more, 100 μL/min or more, 150 μL/min or more, 200 μL/min or more, 300 μL/min or more, 400 μL/min or more, 500 μL/min or more, or 750 μL/min or more).

In some examples, the growth control solution can be injected at an injection rate of 1 milliliter per minute (mL/min) or less (e.g., 900 μL/min or less, 800 μL/min or less, 700 μL/min or less, 600 μL/min or less, 500 μL/min or less, 400 μL/min or less, 300 μL/min or less, 200 μL/min or less, 150 μL/min or less, 100 μL/min or less, 50 μL/min or less, 40 μL/min or less, 30 μL/min or less, 20 μL/min or less, 15 μL/min or less, 10 μL/min or less, 5 μL/min or less, 4 μL/min or less, 3 μL/min or less, 2 μL/min or less, 1 μL/min or less, 950 nL/min or less, 900 nL/min or less, 850 nL/min or less, 800 nL/min or less, 750 nL/min or less, 700 nL/min or less, 650 nL/min or less, 600 nL/min or less, 550 nL/min or less, 500 nL/min or less, 480 nL/min or less, 460 nL/min or less, 440 nL/min or less, 420 nL/min or less, 400 nL/min or less, 380 nL/min or less, 360 nL/min or less, 340 nL/min or less, 320 nL/min or less, 300 nL/min or less, 280 nL/min or less, 260 nL/min or less, 240 nL/min or less, 220 nL/min or less, 200 nL/min or less, 180 nL/min or less, 160 nL/min or less, 140 nL/min or less, 120 nL/min or less, 100 nL/min or less, 90 nL/min or less, 80 nL/min or less, 70 nL/min or less, 60 nL/min or less, 50 nL/min or less, 45 nL/min or less, 40 nL/min or less, 35 nL/min or less, 30 nL/min or less, 25 nL/min or less, 20 nL/min or less, 15 nL/min or less, 10 nL/min or less, 5 nL/min or less, 4 nL/min or less, 3 nL/min or less, 2 nL/min or less, 1 nL/min or less, 750 pL/min or less, 500 pL/min or less, 400 pL/min or less, 300 pL/min or less, 200 pL/min or less, 150 pL/min or less, 100 pL/min or less, 50 pL/min or less, 40 pL/min or less, 30 pL/min or less, 20 pL/min or less, 15 pL/min or less, 10 pL/min or less, or 5 pL/min or less).

The injection rate the growth control solution is injected at can range from any of the minimum values described above to any of the maximum values described above. For example, the growth control solution can be injected at an injection rate of from 1 pL/min to 1 mL/min (e.g., from 1 pL/min to 1 nL/min, from 1 nL/min to 1 µL/min, from 1 µL/min to 1 mL/min, from 1 nL/min to 500 nL/min, from 4 nL/min to 420 nL/min, from 20 nL/min to 85 nL/min, or from 40 nL/min to 45 nL/min).

In some examples, the growth control solution can be injected through a nozzle. In some examples, the injection rate can depend on the diameter of the nozzle. The nozzle can, for example, have a diameter of 100 nanometers (nm) or more (e.g., 150 nm or more, 200 nm or more, 250 nm or more, 300 nm or more, 350 nm or more, 400 nm or more, 500 nm or more, 600 nm or more, 700 nm or more, 800 nm or more, 900 nm or more, 1 micrometer (micron, µm) or more, 5 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 250 µm or more, 300 µm or more, 350 µm or more, 400 µm or more, 500 µm or more, 600 µm or more, 700 µm or more, 800 µm or more, or 900 µm or more). In some examples, the nozzle can have a diameter of 2 millimeters (mm) or less (e.g., 1.5 mm or less, 1 mm or less, 900 µm or less, 800 µm or less, 700 µm or less, 600 µm or less, 500 µm or less, 400 µm or less, 350 µm or less, 300 µm or less, 250 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 5 µm or less, 1 µm or less, 900 nm or less, 800 nm or less, 700 nm or less, 600 nm or less, 500 nm or less, 400 nm or less, 350 nm or less, 300 nm or less, 250 nm or less, or 200 nm or less). The diameter of the nozzle can range from any of the minimum values described above to any of the maximum values described above. For example, the nozzle can have a diameter of from 100 nm to 2 mm (e.g., from 100 nm to 1 µm, from 1 µm to 2 mm, from 100 nm to 1 mm, from 100 nm to 500 µm, from 500 nm to 300 µm, from 1 µm to 200 µm, from 1 µm to 100 µm, from 1 µm to 50 µm, or from 5 µm to 50 µm).

Injecting the growth control solution into the electrolyte at the first location can thereby generate a growth control region at a location in the electrolyte proximate to the first location. The growth control region is located within at least a portion of the three-dimensional area within the electrolyte defined by the diameter of the nozzle the growth control solution is injected through and/or the diffusion gradient of the growth control solution (e.g., the boundary of the growth control region can be defined by the diffusion gradient). The growth control region can, for example, have a diameter of 1 micrometer (micron, µm) or more (e.g., 2 µm or more, 3 µm or more, 4 µm or more, 5 µm or more, 10 µm or more, 15 µm or more, 20 µm or more, 30 µm or more, 40 µm or more, 50 µm or more, 75 µm or more, 100 µm or more, 125 µm or more, 150 µm or more, 200 µm or more, 250 µm or more, 300 µm or more, 350 µm or more, 400 µm or more, 500 µm or more, 600 µm or more, 700 µm or more, 800 µm or more, or 900 µm or more). In some examples, the growth control region can have a diameter of 5 millimeters (mm) or less (e.g., 1 mm or less, 900 µm or less, 800 µm or less, 700 µm or less, 600 µm or less, 500 µm or less, 400 µm or less, 350 µm or less, 300 µm or less, 250 µm or less, 200 µm or less, 150 µm or less, 125 µm or less, 100 µm or less, 75 µm or less, 50 µm or less, 40 µm or less, 30 µm or less, 20 µm or less, 15 µm or less, 10 µm or less, or 5 µm or less). The diameter of the growth control region can range from any of the minimum values described above to any of the maximum values described above. For example, the growth control region can have a diameter of from 1 µm to 5 mm (e.g., from 1 µm to 500 µm, from 500 µm to 5 mm, from 1 µm to 200 µm, from 200 µm to 400 µm, from 400 µm to 600 µm, from 600 µm to 800 µm, from 800 µm to 5 mm, from 1 µm to 400 µm, or from 1 µm to 100 µm).

In some examples the electrolyte, the growth control solution, or a combination thereof can further comprise particles, fibers, wires, sheets, other additional components, or a combination thereof. In some examples, the electrolyte, the growth control solution, or a combination thereof can further comprise nanoparticles comprising $Al_2O_3$, $SiO_2$, $C_{60}$, or a combination thereof. In some other examples, the electrolyte, the growth control solution, or a combination thereof can further comprise Si nanowires, ZnO nanowires, $SiO_2$ nanowires, carbon nanotubes, graphene, or combinations thereof.

In some examples, the working electrode and the counter electrode can be electrically connected to a voltage source. The voltage source can be configured to apply an electric potential to the working electrode, the counter electrode, or a combination thereof so as to establish a voltage between the working electrode and the counter electrode. Suitable voltage sources are known in the art.

The methods can further comprise applying an electric potential to the working electrode, thereby reducing at least a portion of the first metal salt in the electrolyte and depositing a layer of metal at a location defined by the growth control region. For example, when the electrolyte comprises a suppressor and the growth control solution comprises an accelerator, the layer of metal can be deposited inside the growth control region. In certain examples, when the electrolyte comprises a suppressor and the growth control solution does not include a suppressor, the layer of metal can be deposited inside the growth control region. In certain examples, when the growth control solution comprises a suppressor and the electrolyte does not include a suppressor, the layer of metal can be deposited outside the growth control region.

The applied electric potential can be any potential sufficient to reduce the first metal salt in the electrolyte. For example, the applied electric potential can be −2 volts (V) or more (e.g., −1.9 V or more, −1.8 V or more, −1.7 V or more, −1.6 V or more, −1.5 V or more, −1.4 V or more, −1.3 V or more, −1.2 V or more, −1.1 V or more, −1.0 V or more, −0.9 V or more, −0.8 V or more, −0.7 V or more, −0.6 V or more, −0.5 V or more, −0.4 V or more, −0.3 V or more, −0.2 V or more, −0.1 V or more, 0 V or more, 0.1 V or more, 0.2 V or more, 0.3 V or more, 0.4 V or more, 0.5 V or more, 0.6 V or more, 0.7 V or more, or 0.8 V or more). In some examples, the applied electric potential can be 1 V or less (e.g., 0.9 V or less, 0.8 V or less, 0.7 V or less, 0.6 V or less, 0.5 V or less, 0.4 V or less, 0.3 V or less, 0.2 V or less, 0.1 V or less, 0 V or less, −0.1 V or less, −0.2 V or less, −0.3 V or less, −0.4 V or less, −0.5 V or less, −0.6 V or less, −0.7 V or less, −0.8 V or less, −0.9 V or less, −1.0 V or less, −1.1 V or less, −1.2 V or less, −1.3 V or less, −1.4 V or less, −1.5 V or less, −1.6 V or less, −1.7 V or less, or −1.8 V or less). The applied electric potential can range from any of the minimum values described above to any of the maximum values described above. For example, the applied electric potential can be from −2 V to 1 V (e.g., from −2 V to −0.5 V, from −0.5 V to 1 V, from −2 V to −1 V, from −1 V to 0 V, from 0 V to 1 V, from −1.5 V to 0 V, from −0.5 V to 0 V, or from −0.4 V to −0.2 V). In some examples, the applied electric potential is measured against a reference electrode, such as a standard hydrogen electrode (SHE) or a copper strip. Any suitable reference electrode compatible with the systems and methods described herein can be used. Suitable reference electrodes are known in the art.

The methods can further comprise repeating the injecting and applying steps to form the three-dimensional structure on a layer-by-layer basis on the working electrode. As used herein, "a three-dimensional structure" and "the three-dimensional structure" are meant to include any number of three-dimensional structures in any arrangement on the working electrode. Thus, for example "a three-dimensional structure" includes one or more three-dimensional structures. In some embodiments, the three-dimensional structure can comprise a plurality of three-dimensional structures. In some embodiments, the three-dimensional structure can comprise a plurality of three-dimensional structures arranged in an ordered array.

In some examples, the growth control solution can be injected through a nozzle and the nozzle can, for example, be separated from the forming three-dimensional structure by a distance of 1 micrometer (micron, μm) or more (e.g., 2 μm or more, 3 μm or more, 4 μm or more, 5 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, or 80 μm or more). In some examples, the nozzle can be separated from the forming three-dimensional structure by a distance of 100 μm or less (e.g., 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, or 5 μm or less). The distance between the nozzle can the forming three-dimensional structure can range from any of the minimum values described above to any of the maximum values described above. For example, the nozzle can be separated from the forming three-dimensional structure by a distance of from 1 μm to 100 μm (e.g., 1 μm to 90 μm, from 1 μm to 80 μm, from 1 μm to 70 μm, from 1 μm to 60 μm, from 5 μm to 50 μm, from 10 μm to 40 μm, from 15 μm to 30 μm, or from 15 μm to 25 μm). In some examples, the distance between the nozzle and the forming three-dimensional structure is substantially maintained throughout the production of the three-dimensional structure.

In some examples, the three-dimensional structure is produced at a growth rate of 0.1 micrometers per minute (μm/min) or more (e.g., 0.5 μm/min or more, 1 μm/min or more, 1.5 μm/min or more, 2 μm/min or more, 2.5 μm/min or more, 3 μm/min or more, 3.5 μm/min or more, 4 μm/min or more, 4.5 μm/min or more, 5 μm/min or more, 6 μm/min or more, 7 μm/min or more, 8 μm/min or more, 9 μm/min or more, 10 μm/min or more, 15 μm/min or more, 20 μm/min or more, 25 μm/min or more, 30 μm/min or more, 40 μm/min or more, 50 μm/min or more, 60 μm/min or more, 70 μm/min or more, 80 μm/min or more, 90 μm/min or more, 100 μm/min or more, 125 μm/min or more, 150 μm/min or more, or 175 μm/min or more). In some examples, the three-dimensional structure can be produced at a growth rate of 200 μm/min or less (e.g., 175 μm/min or less, 150 μm/min or less, 125 μm/min or less, 100 μm/min or less, 90 μm/min or less, 80 μm/min or less, 70 μm/min or less, 60 μm/min or less, 50 μm/min or less, 40 μm/min or less, 30 μm/min or less, 25 μm/min or less, 20 μm/min or less, 15 μm/min or less, 10 μm/min or less, 9 μm/min or less, 8 μm/min or less, 7 μm/min or less, 6 μm/min or less, 5 μm/min or less, 4.5 μm/min or less, 4 μm/min or less, 3.5 μm/min or less, 3 μm/min or less, 2.5 μm/min or less, 2 μm/min or less, 1.5 μm/min or less, or 1 μm/min or less). The growth rate at which the three-dimensional structure is produced ca range from any of the minimum values described above to any of the maximum values described above. For example, the three-dimensional structure can be produced at a growth rate of from 0.1 μm/min to 200 μm/min (e.g., from 0.1 μm/min to 100 μm/min, from 100 μm/min to 200 μm/min, from 0.1 μm/min to 150 μm/min, from 0.1 μm/min to 50 μm/min, from 0.1 μm/min to 40 μm/min, from 0.1 μm/min to 30 μm/min, from 0.5 μm/min to 20 μm/min, or from 1 μm/min to 10 μm/min).

The three-dimensional structure can be of any shape, for example, a dot, a pillar, a cube, a sphere, a wall, a spiral, a ring, or a combination thereof.

In some examples, the injection rate of the growth control solution, the applied electric potential, or a combination thereof can be modulated during the electrochemical additive manufacturing of the three-dimensional structure such that the three-dimensional structure comprises a first composition and a second composition, wherein the first composition and the second composition are different. For example, if the growth solution comprises a first metal salt comprising a first metal and a second metal salt comprising a second, wherein the first metal and the second metal are different, the applied electric potential can be selected to reduce the first metal or to reduce both the first metal and the second metal, such that modulating the applied electric potential can modify the local concentration of the first metal and/or second metal within the three-dimensional structure.

In some examples, the methods can further comprise chemically etching the three-dimensional structure comprising the first composition and the second composition to selectively etch the first composition, thereby forming an etched three-dimensional structure. The etched three-dimensional structure can, for example, be free-standing, hollow, hanging, or a combination thereof.

In some examples, the methods can further comprise forming a second three-dimensional structure by: injecting the growth control solution at a second location proximate the working electrode, thereby generating a second growth control region at a location in the electrolyte proximate to the second location; applying an electric potential to the working electrode, thereby reducing at least a portion of the first metal salt in the electrolyte and depositing a layer of metal at a location defined by the second growth control region; and repeating the injecting and applying steps for form the second-three-dimensional structure on a layer-by-layer basis on the working electrode.

As used herein, "a second location" and "the second first location" are meant to include any number of locations in any arrangement in the electrolyte. Thus, for example "a second location" includes one or more second locations. In some embodiments, the second location can comprise a plurality of locations. In some embodiments, the second location can comprise a plurality of locations arranged in an ordered array.

As used herein, "a second three-dimensional structure" and "the second three-dimensional structure" are meant to include any number of three-dimensional structures in any arrangement on the working electrode. Thus, for example "a second three-dimensional structure" includes one or more three-dimensional structures. In some embodiments, the second three-dimensional structure can comprise a plurality of three-dimensional structures. In some embodiments, the second three-dimensional structure can comprise a plurality of three-dimensional structures arranged in an ordered array.

In some examples, the working electrode can be translocated in order to inject the growth control solution at the second location. As used herein translocating refers to any type of movement about any axis (e.g., rotation, translation, etc.) In other words, as used herein, translocation refers to a change in position and/or orientation. For example, the working electrode and the electrolyte can be located within a container and the container can be located on a stage that is moveable in three-dimensional space. Thus, the working electrode and the electrolyte can, in some examples, be translocated via the movable stage.

In some examples, the growth control solution is injected through a nozzle and the nozzle is translocated in order to inject the growth control solution at the second location. For example, the injector can be connected to a device that can translocate the injector in three-dimensional space. In some examples, when the working electrode is translocated, the nozzle is stationary. In some examples, when the nozzle is translocated, the working electrode is stationary. In some examples, both the working electrode and the nozzle are translocated.

Also disclosed herein are patterned samples made using any of the methods described herein. Also disclosed herein are methods of use of the patterned samples and/or the three-dimensional structures made by any of the methods disclosed herein, the methods of use comprising using the patterned samples and/or the three-dimensional structures as mechanical components or electrical contacts, using the patterned samples and/or the three-dimensional structures for a micro-electro-mechanical system (MEMS) device, assembling the three-dimensional structures into micromachines, and the like.

Also disclosed herein are systems for performing the methods described herein. Referring now to FIG. 1, disclosed herein are systems 100 for producing a three-dimensional structure using electrochemical additive manufacturing, the system 100 comprising: an electrolyte 102, a working electrode 104, and a counter electrode 106; wherein the electrolyte 102 is in electrochemical contact with the working electrode 104 and the counter electrode 106; and wherein the electrolyte 102 comprises a first metal salt; an injector 108 configured to inject a growth control solution into the electrolyte 102 at a first location proximate the working electrode 104, thereby generating a growth control region at a location in the electrolyte 102 proximate to the first location; and wherein the system 100 is configured to form three-dimensional structure on a layer-by-layer basis on the working electrode 104.

Figure 2:
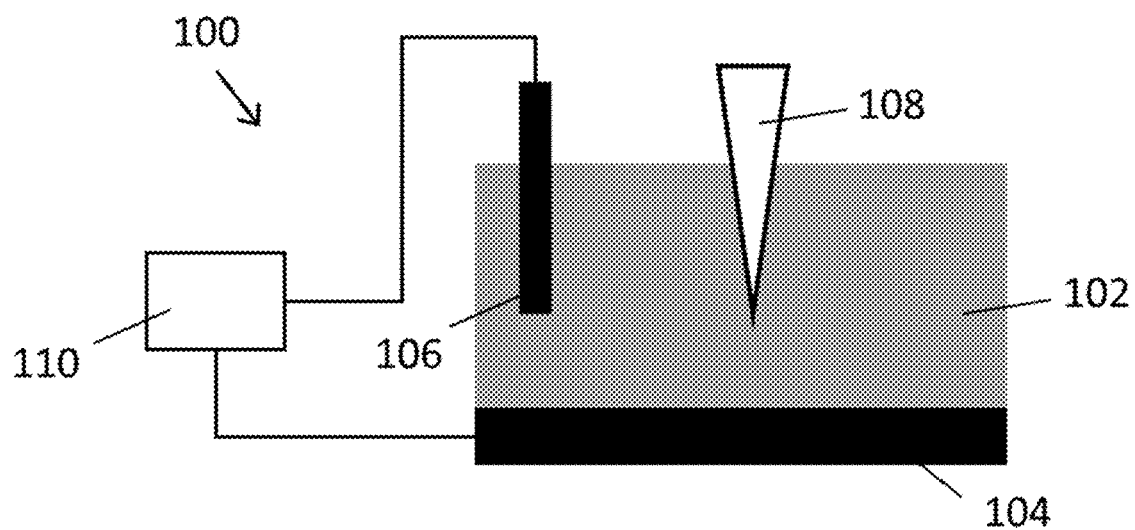
FIG. 2 is a schematic of an exemplary system as disclosed herein.

In some examples, the system can further comprise a voltage source 110, for example as shown in FIG. 2. Suitable voltage sources are known in the art. In some examples, the working electrode 104 and the counter electrode 106 can be electrically connected to the voltage source 110. The voltage source 110 can be configured to apply an electric potential to the working electrode 104, the counter electrode 106, or a combination thereof so as to establish a voltage between the working electrode 104 and the counter electrode 106. The voltage source 110 can, for example, be configured to apply an electric potential to the working electrode 104, thereby reducing at least a portion of the first metal salt in the electrolyte 102 and depositing a layer of metal at a location defined by the growth control region. In some examples, the voltage source 110 is configured to apply an electric potential of from −2 V to 1 V (e.g., from −1.5 V to 0 V, from −1 V to 0 V, from −0.5 V to 0 V, or from −0.4 V to −0.2 V).

Figure 3:
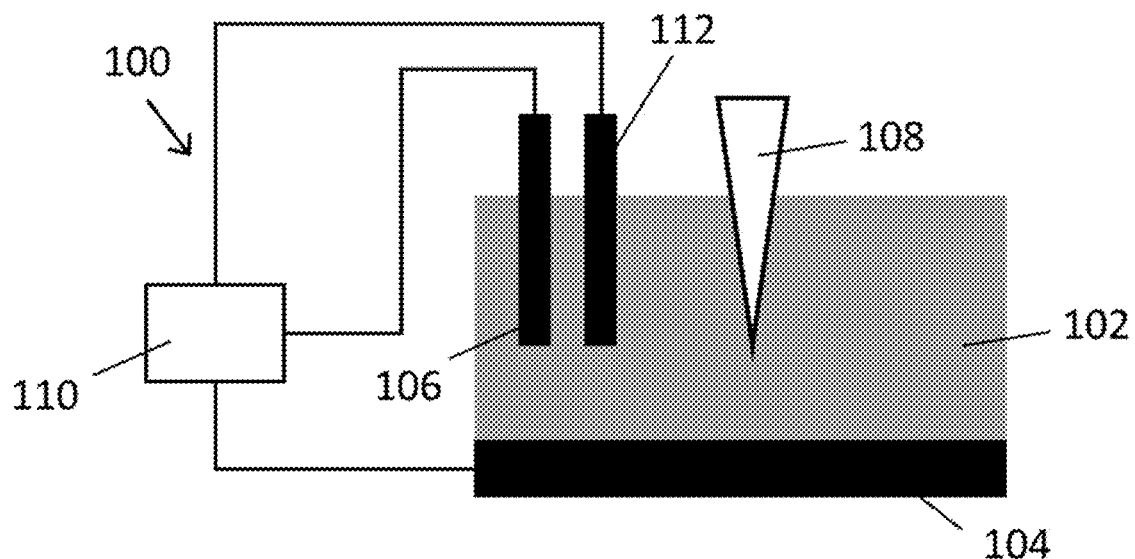
FIG. 3 is a schematic of an exemplary system as disclosed herein.

Referring now to FIG. 3, in some examples, the systems 100 can further comprise a reference electrode 112, wherein the reference electrode 112 is in electrochemical contact with the electrolyte 102. The reference electrode 112 can comprise any conducting material consistent with the methods and systems described herein. Appropriate materials for reference electrodes 112 are well known in the art.

Figure 4:
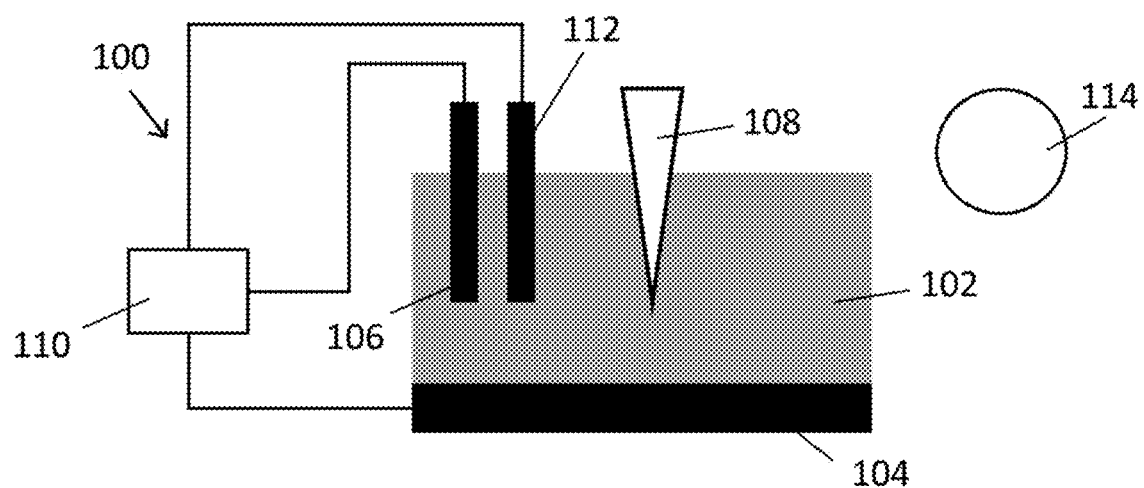
FIG. 4 is a schematic of an exemplary system as disclosed herein.

Referring now to FIG. 4, in some examples, the systems 100 can further comprise an instrument 114 configured to capture an electromagnetic signal (e.g., an optical signal) from the working electrode 104 and/or the three-dimensional structure. The instrument 114 can, for example, comprise a camera, an optical microscope, a spectrometer, or combinations thereof.

In some examples, the injector 108 is configured to inject the growth control solution at an injection rate of from 1 pL/min to 1 mL/min (e.g., from 1 pL/min to 1 nL/min, from 1 nL/min to 1 µL/min, from 1 µL/min to 1 mL/min, from 1 nL/min to 500 nL/min, from 4 nL/min to 420 nL/min, from 20 nL/min to 85 nL/min, or from 40 nL/min to 45 nL/min).

The systems 100 can, for example, further comprises a means for translocating the working electrode 104, the injector 108, or a combination thereof.

In some examples, the injector 108 comprises a nozzle, the injector 108 is configured to inject the growth control solution through the nozzle, and the nozzle is separated from the forming three-dimensional structure by a distance of from 1 µm to 100 µm (e.g., from 1 µm to 60 µm, from 5 µm to 50 µm, from 10 µm to 40 µm, from 15 µm to 30 µm, or from 15 µm to 25 µm).

Figure 5:
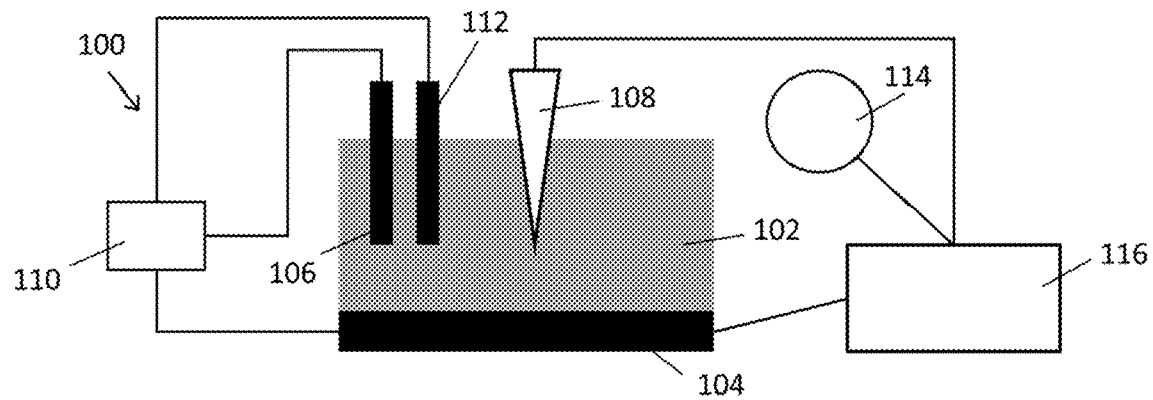
FIG. 5 is a schematic of an exemplary system as disclosed herein.

In some examples, the systems 100 can further comprise a computing device 116 configured to receive an electromagnetic signal from the instrument 114 and/or transmit an electromagnetic signal to the means for translocating the working electrode 104, the injector 108, or a combination thereof, for example as shown in FIG. 5.

Figure 6:
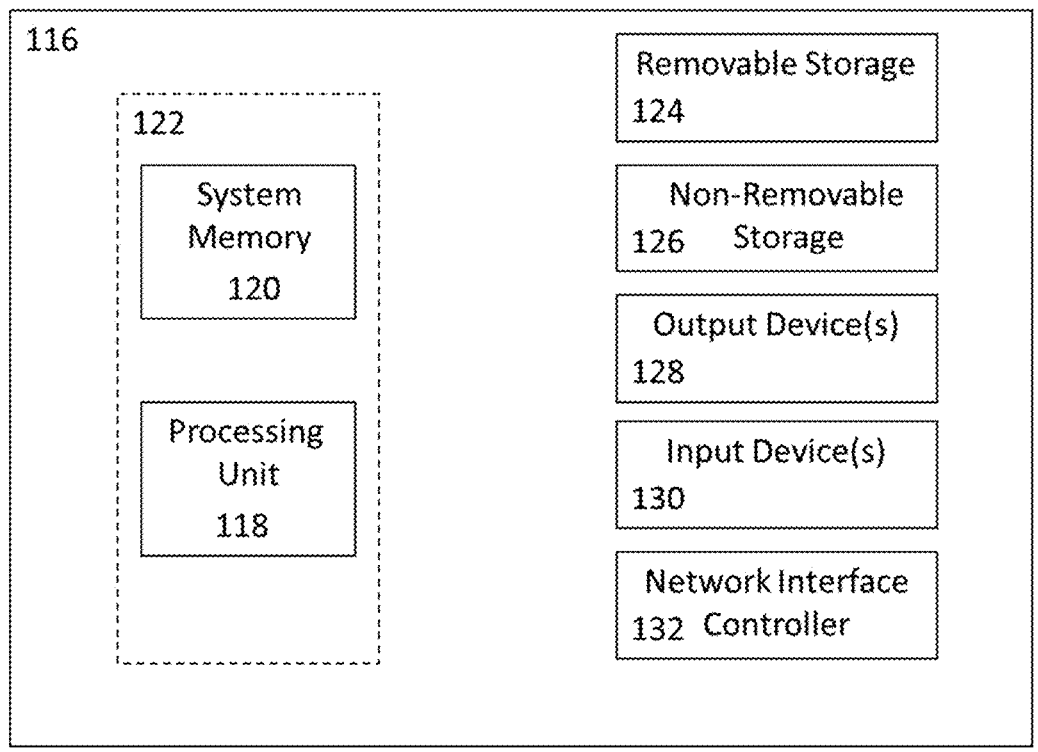
FIG. 6 is a schematic of an exemplary computing device.

FIG. 6 illustrates an example computing device 116 upon which examples disclosed herein may be implemented. The computing device 116 can include a bus or other communication mechanism for communicating information among various components of the computing device 116. In its most basic configuration, computing device 116 typically includes at least one processing unit 118 (a processor) and system memory 120. Depending on the exact configuration and type of computing device, system memory 120 may be volatile (such as random access memory (RAM)), non-volatile (such as read-only memory (ROM), flash memory, etc.), or some combination of the two. This most basic configuration is illustrated in FIG. 6 by a dashed line 122. The processing unit 118 may be a standard programmable processor that performs arithmetic and logic operations necessary for operation of the computing device 116.

The computing device 116 can have additional features/functionality. For example, computing device 116 may include additional storage such as removable storage 124 and non-removable storage 126 including, but not limited to, magnetic or optical disks or tapes. The computing device 116 can also contain network connection(s) 132 that allow the device to communicate with other devices. The computing device 116 can also have input device(s) 130 such as a keyboard, mouse, touch screen, antenna or other systems configured to communicate with the camera in the system described above, etc. Output device(s) 128 such as a display, speakers, printer, etc. may also be included. The additional devices can be connected to the bus in order to facilitate communication of data among the components of the computing device 116.

The processing unit 118 can be configured to execute program code encoded in tangible, computer-readable media. Computer-readable media refers to any media that is capable of providing data that causes the computing device 116 (i.e., a machine) to operate in a particular fashion. Various computer-readable media can be utilized to provide instructions to the processing unit 118 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 118 can execute program code stored in the system memory 120. For example, the bus can carry data to the system memory 120, from which the processing unit 118 receives and executes instructions. The data received by the system memory 120 can optionally be stored on the removable storage 124 or the non-removable storage 126 before or after execution by the processing unit 118.

The computing device 116 typically includes a variety of computer-readable media. Computer-readable media can be any available media that can be accessed by device 116 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 120, removable storage 124, and non-removable storage 126 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 116. Any such computer storage media can be part of computing device 116.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, the system 100 further comprises a computing device 116 comprising a processor 118 and a memory 120 operably coupled to the processor 118, the memory 120 having further computer-executable instructions stored thereon that, when executed by the processor 118, cause the processor 118 to: receive an electromagnetic signal from the instrument 114; process the electromagnetic signal to obtain the distance between the nozzle and the forming three-dimensional structure; transmit an electromagnetic signal to the means for translocating the working electrode 104, the injector 108, or a combination thereof; and translocate the working electrode 104 and/or the injector 108 based on the transmitted electromagnetic signal such that the distance between the nozzle and the forming three-dimensional structure is substantially maintained throughout the production of the three-dimensional structure.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

A system as described herein above was used to create a three-dimensional structure using the methods described herein. A nozzle with an internal diameter of 15 um and an injection rate of 42 nL/min were used. An optical microscope with 1000× magnification and 50 mm focal distance was used to enable in-situ observation of the nozzle as well as the growth of 3D structure. The electrolyte contained 0.6 M $CuSO_4$, 0.1 M $H_2SO_4$, and various amounts of HCl and polyethylene glycol (PEG, average MW=3,400). A silicon coupon with an evaporated 100 nm gold layer was fixed in the glass cell and used as the cathode. Two copper strips were used as the anode and reference electrode. Numerical simulation was carried out with a COMSOL multi-physics package. A JEOL 7000 scanning electron microscope (SEM) was used to characterize the 3D structures.

Figure 7:
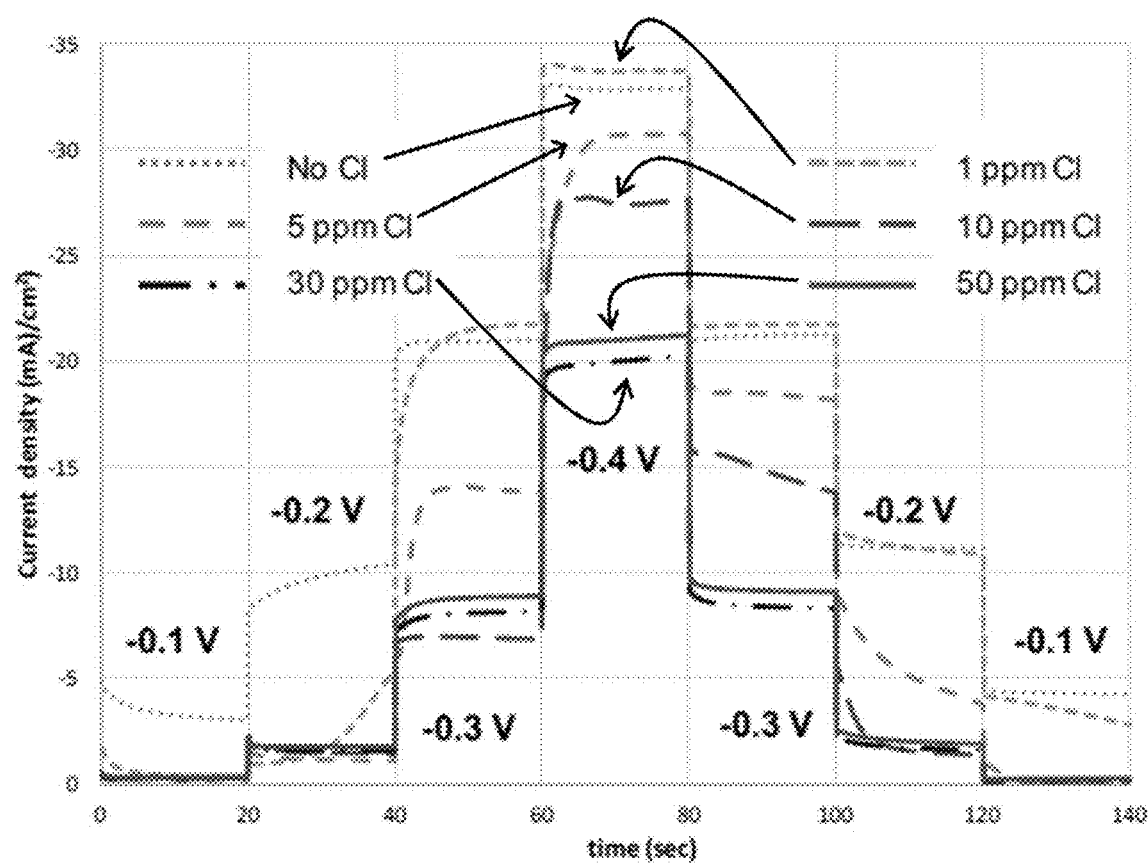
FIG. 7 is the pulsed amperometries of copper electrodeposition in bulk electrolytes with various chloride concentrations.

Deposition at different voltages with different amount of $Cl^-$ was carried out and the results are presented in FIG. 7. The purpose of this study was to identify the voltage that results in the most pronounced contrast in the deposition rates between $Cl^-$-free and fully suppressed cases. Full suppression of copper electrodeposition was observed for 30 ppm $Cl^-$ and no difference was observed between 30 ppm and 50 ppm cases for all the potentials studied. While current transient behaviors were observed in some cases, such transients mostly did no persist beyond 20 seconds. In other words, steady state deposition behaviors were typically achieved within 20 seconds. The ratio between the deposition rates in $Cl^-$-free and fully suppressed cases was the highest at a potential of −0.2 V for the potentials studied. Little copper deposition would occur even with as low as 1 ppm $Cl^-$ if the potential is held at −0.2 V. This is expected to result in minimum background Cu deposition. The absolute difference in the deposition rates was, however, the largest at −0.3 V. This suggests that a 3-D structure would be formed fastest at −0.3 V. While this difference is approximately the same at a higher potential of −0.4 V, the background deposition at the fully suppressed state is much more significant at a potential of −0.4 V. Therefore, 30 ppm $Cl^-$ and a potential of −0.3 V will be used in further studies.

Figures 8A, 8B, 8C, 8D, 8E, 8F:
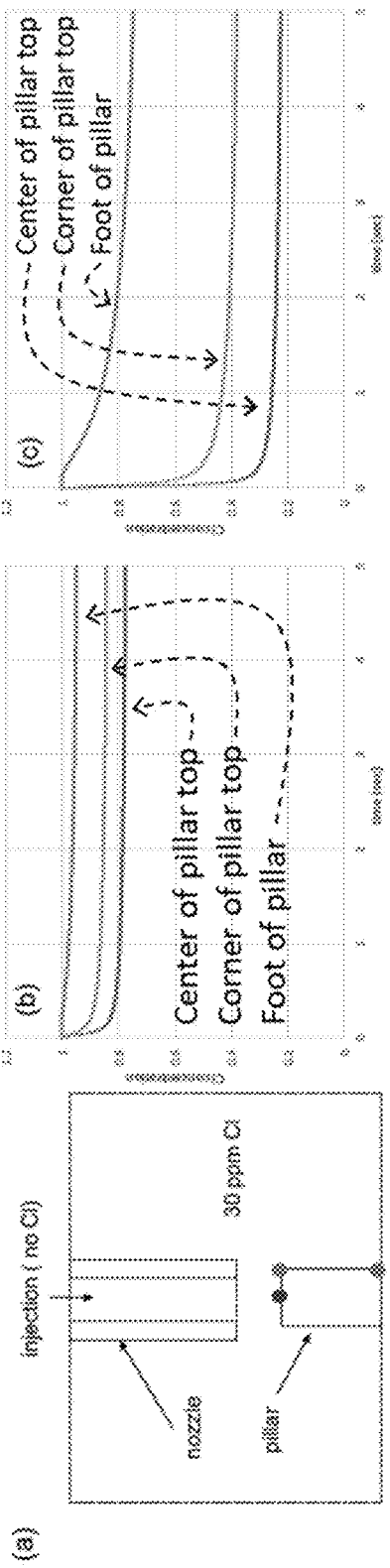
FIG. 8A-FIG. 8F.

While the contrast between deposition in presence of 0 ppm and 30 ppm $Cl^-$ has been maximized, the difference in $Cl^-$ concentrations at the tip and foot of the pillar ultimately determines the growth behavior. This difference was numerically calculated and the impacts of different operation conditions were evaluated. FIG. 8A is a diagram showing the three locations where the $Cl^-$ concentrations were calculated, the center of the top of the pillar, a corner of the top of the pillar, and a corner of the foot of the pillar.

FIG. 8B to FIG. 8F show five cases with different injection rates for a 50 μm tall and 20 μm wide pillar that is under the injection nozzle across a 20 μm gap. At a slow injection rate of 4.2 nL/min (FIG. 8B), no $Cl^-$-free zone was created due to the fast diffusion of $Cl^-$. The $Cl^-$ concentration remains at 80% of bulk concentration (24 ppm in this case) even at the center of the top of the pillar. Therefore, copper deposition is expected to be almost fully suppressed everywhere. On the other hand, the $Cl^-$ concentration drops to 0 within 1 second even at the foot of the pillar when a high injection rate of 420 nL/min was used (FIG. 8F). In other words, no suppression is expected at such a high injection rate and copper will be deposited uniformly within a wide area under the nozzle. When an intermediate injection rate was used, e.g. between 21 nL/min and 84 nL/min, a contrast in growth rate resulted between the top of the pillar and the foot of the pillar. Among the injection rates of 21 nL/min, 42 nL/min and 84 nL/min, the 42 nL/min injection rate resulted in the most pronounced contrast between the concentration of $Cl^-$ at the top of the pillar and deposition at the foot of the pillar. In addition, a nearly $Cl^-$-free zone was maintained at the top of the pillar. The concentration at the foot of the pillar stabilizes at about 55% of the bulk concentration (16 ppm), which would still be fully suppressed at −0.3 V (FIG. 7). A slower injection of 21 nL/min resulted in a steady state $Cl^-$ concentration of 7 ppm and 11 ppm at the center of the top of the pillar and the corner of the top of the pillar, respectively, which would significantly suppress the growth rate of pillar. On the other hand, 9 ppm $Cl^-$ is present at the pillar foot after 5 seconds with an injection rate of 84 nL/min, which imposes a risk of significant background deposition or fattening of 3D structures. Therefore, under the conditions tested herein, an injection rate of 42 nL/min seemed to be optimal for the desired results and was used in the following studies.

A demonstration of the formation of a pillar was carried out at a potential of −0.3 V with an injection of 42 nL/min $Cl^-$-free electrolyte into 30 ppm Cl electrolyte. The nozzle was kept at about 20 μm above the pillar, and the gap size was maintained using a constant stage movement speed. As shown in FIG. 9A-FIG. 9C, a 780 μm tall pillar was formed with a 2 hour deposition. From the electrochemical investigation (FIG. 7), the deposition current density in absence of $Cl^-$ and agitation was 21 $mA/cm^2$, equivalent to a deposition rate of 0.47 μm/min. However, the growth rate of the pillar was more than 13 times higher, at about 6.5 μm/min. This is believed to be due to the increased $Cu^{2+}$ diffusion because of the injected flow as well as the spherical geometry of the diffusion toward the micro-tip of the pillar. The background copper growth depends on the strength of suppression for this particular suppressor system, Cl-PEG. The deposition current density in the presence of 30 ppm Cl without agitation was 8.1 $mA/cm^2$, equivalent to a deposition rate of 0.18 μm/min or 22 μm for 2 hours. The Cu film at the base of pillar was about 40 μm thick, suggesting a slightly increased deposition rate than the stationary case in FIG. 7. In addition, the pillar was about 101 µm in diameter at the foot and about 20 µm in diameter at the top, consistent with the 40 µm widening during the course of a 2 hour deposition. The surface of the pillar was relatively smooth and the cross-section SEM analysis shows the dense defect-free structure of pillar (FIG. 9C).

An electrodeposition method to form free standing 3D metal structures based on the injection of additives was proposed, evaluated, and demonstrated using copper-Cl-PEG system. The injection of chloride free electrolyte through a micro-nozzle into a fully suppressed electrolyte with 30 ppm chloride resulted in local copper deposition under the nozzle. Electrochemical studies on blanket substrates showed the highest deposition rate contrast was obtained at a potential of −0.3 V. Numerical simulations predicted that the fast diffusion of Cl⁻ limits the Cl⁻-free zone such that it largely remains around the tip of the pillar. Numerical simulations also indicated that the slower diffusion of PEG can result in a much larger and faster-growing PEG-free zone, which suggested the injection of PEG-free electrolyte will not be ideal for the purposes envisioned herein.

Furthermore, an injection rate of 42 nL/min was predicted to be optimal for the purposes disclosed herein, enclosing the pillar top in the Cl⁻-free zone while avoiding significant dilution of the Cl⁻ at the foot of the pillar. While this Cl⁻ concentration at the foot of the pillar increases as the pillar grows and the nozzle moves upwards, the gap between the top of the pillar and nozzle has little impact on this concentration. However, a smaller gap is beneficial to the concentration difference and therefore the deposition rate difference between the top of the pillar and the foot of the pillar.

Example 2

Described herein is an electrochemical 3D printing technology that can directly form microstructures of nanomaterials. The relation between the composition of the microstructures and printing conditions such as electrolytes, applied potential, agitation, and potential pulses will be discussed. 3D printing of microstructures of magnetic NiFe alloys and copper-carbon nanotube composite materials will be discussed.

An example of a three-dimensional structure fabricated using the electrochemical additive manufacturing methods described herein is shown in FIG. 10.

Figure 11:
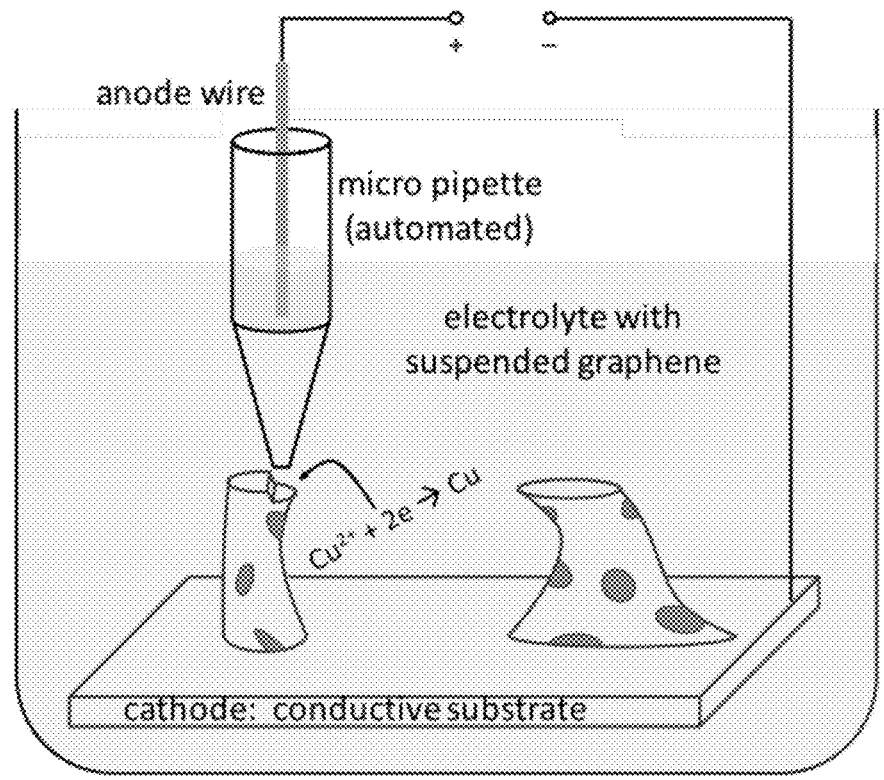
FIG. 11 shows a schematic diagram of the printer.
Figure 12:
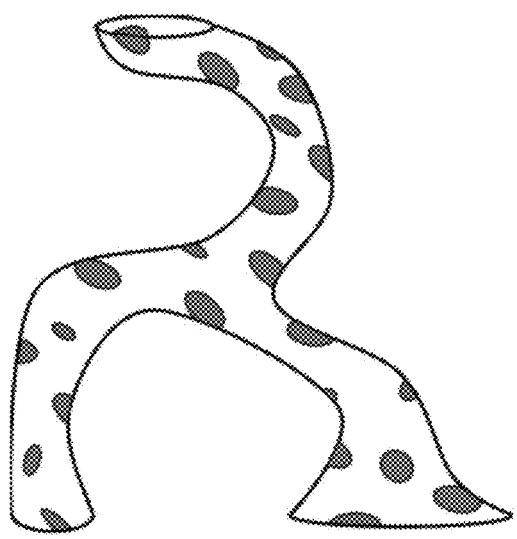
FIG. 12 shows a schematic diagram of a 3D structure of copper-carbon nanotube composite material.

The relation between the 3D printing process and carbon nanotube (CNT) incorporation in the composite will be discussed, as these can closely be related to the properties of the structures. FIG. 11 shows a schematic diagram of the printer and FIG. 12 shows a schematic diagram of a 3D structure of copper-carbon nanotube composite material.

Figure 13:
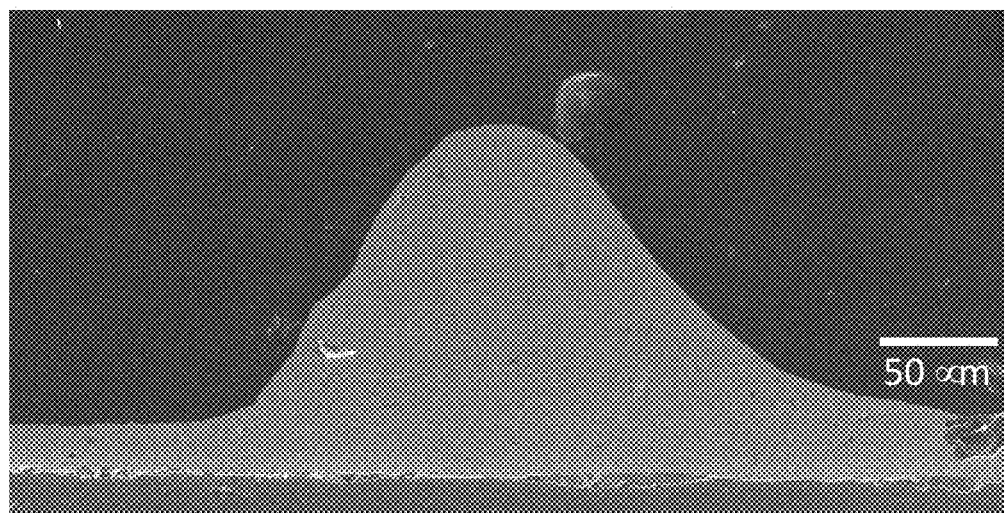
FIG. 13 is an image of a short pillar of a copper-graphene composite fabricated using the methods described herein.
Figure 14:
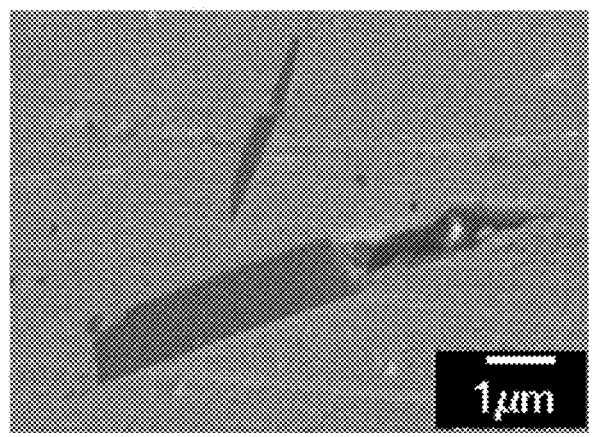
FIG. 14 is a magnified view of a portion of the short pillar shown in FIG. 13 showing the graphene embedded in the copper pillar.
Figure 15:
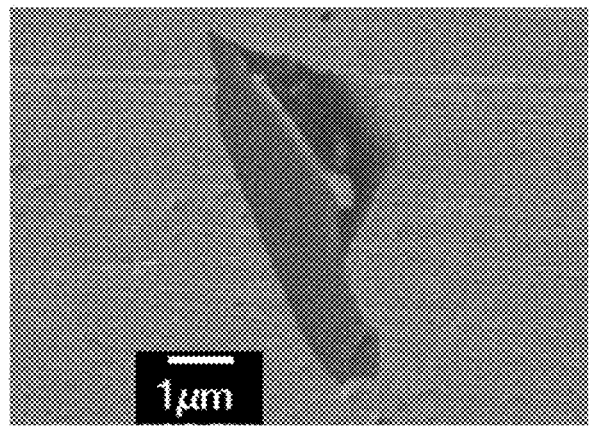
FIG. 15 is a magnified view of a portion of the short pillar shown in FIG. 13 showing the graphene embedded in the copper pillar.

FIG. 13 is an image of a short pillar of a copper-graphene composite fabricated using the methods described herein. FIG. 14 and FIG. 15 are magnified portions of the short pillar shown in FIG. 13 showing the graphene embedded in the copper pillar.

These methods can enable the direct formation of 3D microstructures and microdevices with unique properties as a result of combining different materials at a micro- and nano-scale. The particular example of copper-carbon nanotube composite material not only offers a higher conductivity (Subramaniam C et al. *Nature communications,* 2013, 4, 2202) than copper but also improves the mechanical strength (Chai G et al. *Journal of Micromechanics and Microengineering,* 2008, 18(3), 035013) and lowers the thermal expansion (Chu K and Jia C. *Applied Physics A,* 2013, 111(2), 439) of copper. These attributes can be beneficial for applications in microelectronics, where highly conductive, mechanically robust and thermally reliable structures are needed.

Figure 16:
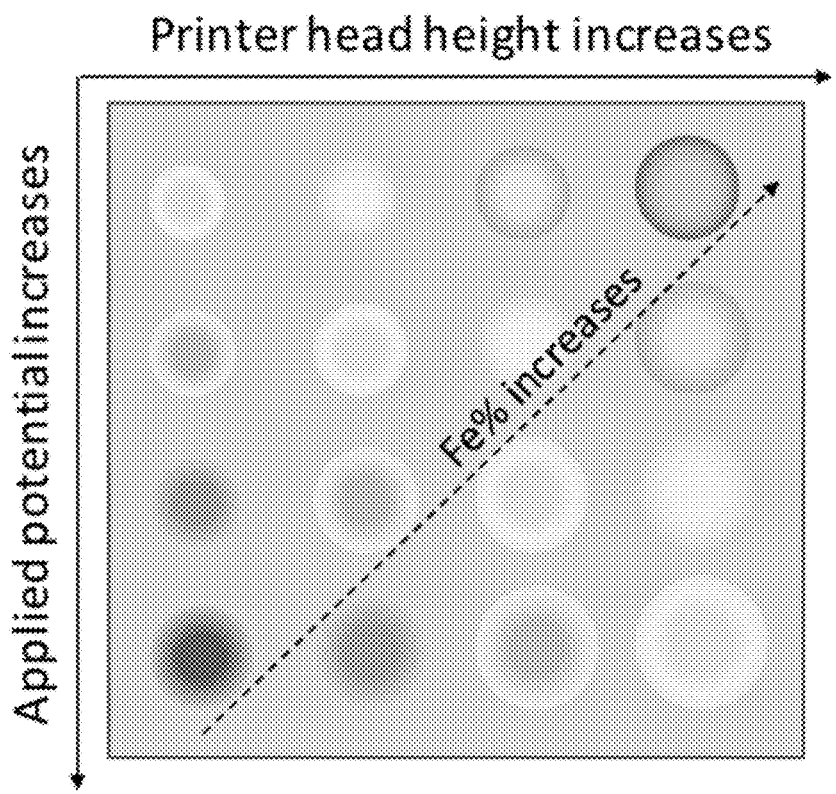
FIG. 16 shows a schematic of a printed dot matrix that can be used to study the effects of applied potential and printer head height on the deposition rates of Ni and Fe.
Figure 17:
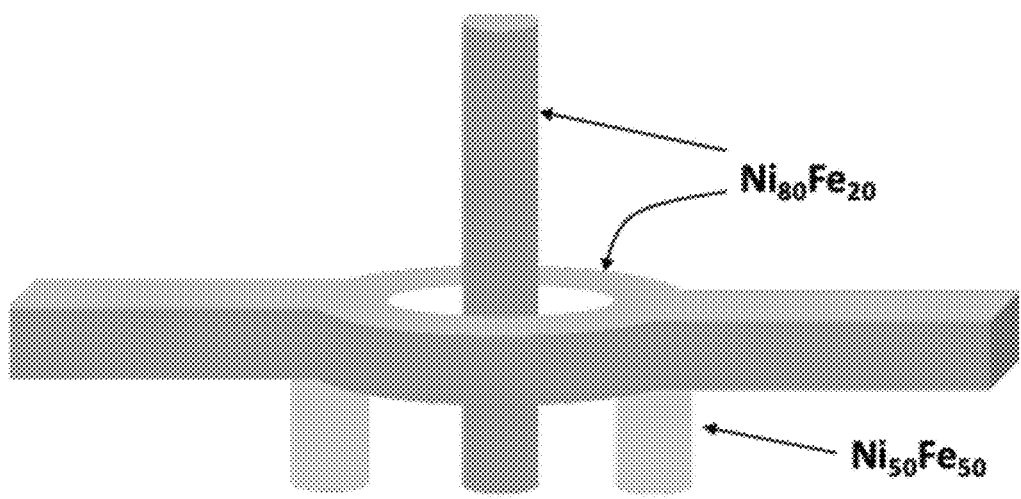
FIG. 17 shows a schematic diagram of a pillar and stir bar printed of various Ni—Fe alloys.

The electrochemical 3D printing can be used, for example, to build a nickel-iron (NiFe) alloy micro magnetic stir bar. As shown in FIG. 16, the effects of applied potential and printer head height on the deposition rates of Ni and Fe can be studied using a printed dot matrix. The results can be compared with pure elemental solutions to understand the effect of one element on the deposition of the other element and to enable the control of the composition and height of the printed 3-D structures. A pillar and a stir bar can be printed with $Ni_{80}Fe_{20}$ alloy (FIG. 17). The stir bar can comprise a donor structure anchored on the pillar. Two auxiliary pillars can be printed with $Ni_{80}Fe_{20}$ alloy to support the stirrer during the print. Because of the higher chemical resistance of $Ni_{80}Fe_{20}$ than $Ni_{50}Fe_{50}$, the auxiliary supporting pillars can be removed (Huang Q et al. *Journal of applied electrochemistry,* 2006, 36(8), 871; U.S. Pat. No. 7,736,753) using chemical etching, allowing the stir bar to spin freely in a rotating magnetic field generated on a commercial magnetic stirrer.

Multi-wall carbon nanotubes can be used for the investigation of 3D printing of copper-carbon nanotube composite structures. Copper electrolytes with different carbon nanotube concentrations can be used in conjunction with applied potentials to study their impacts on carbon nanotube incorporation in the copper deposit. The effect of agitation on carbon nanotube incorporation can be investigated using ultrasonic homogenizer operated at various power. Potential pulses can be applied to the printer and the effect of the pulse duration and frequency on carbon nanotube incorporation can be explored as well. 3D printing of copper-carbon nanotube composite structure can then be attempted using the results of the trials described above.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A system for producing a three-dimensional structure using electrochemical additive manufacturing, the system comprising:
   an electrolyte, a working electrode, and a counter electrode;
   wherein the electrolyte is in electrochemical contact with the working electrode and the counter electrode; and
   wherein the electrolyte comprises a first metal salt;
   a growth control solution; and
   an injector comprising a nozzle, wherein the injector is configured to inject the growth control solution through the nozzle into the electrolyte at a first location proximate the working electrode, thereby generating a growth control region at a location in the electrolyte proximate to the first location;

wherein the system is configured to form a three-dimensional structure on a layer-by-layer basis on the working electrode;

wherein the growth control solution and the electrolyte are different, and:

the electrolyte further comprises a suppressor and the growth control solution comprises an accelerator, such that when an electric potential is applied to the working electrode at least a portion of the first metal salt in the electrolyte is reduced, and a layer of metal is deposited inside the growth control region;

the electrolyte further comprises a suppressor and the growth control solution does not include a suppressor, such that when an electric potential is applied to the working electrode at least a portion of the first metal salt in the electrolyte is reduced, and a layer of metal is deposited inside the growth control region; or the growth control solution comprises a suppressor and the electrolyte does not include a suppressor, such that when an electric potential is applied to the working electrode at least a portion of the first metal salt in the electrolyte is reduced, and a layer of metal is deposited outside the growth control region;

and wherein the nozzle is separated from the layer of metal by a distance of from 1 μm to 100 μm.

2. The system of claim 1, further comprising a voltage source, wherein the working electrode and the counter electrode are electrically connected to the voltage source and the voltage source is configured to apply an electric potential to the working electrode, thereby reducing at least a portion of the first metal salt in the electrolyte and depositing a layer of metal at a location defined by the growth control region.

3. The system of claim 1, wherein the system further comprises a means for translocating the working electrode.

4. The system of claim 3, wherein the system further comprises:

an instrument configured to capture an electromagnetic signal from the working electrode, the layer of metal, the nozzle, or a combination thereof; and a computing device comprising a processor and a memory operably coupled to the processor, the memory having further computer-executable instructions stored thereon that, when executed by the processor, cause the processor to:

receive an electromagnetic signal from the instrument;

process the electromagnetic signal to obtain the distance between the nozzle and the layer of metal;

transmit an electromagnetic signal to the means for translocating the working electrode; and translocate the working electrode based on the transmitted electromagnetic signal such that the distance between the nozzle and the layer of metal is substantially maintained throughout the production of the three-dimensional structure.

5. The system of claim 1, wherein the electrolyte further comprises a suppressor, the growth control solution does not include a suppressor, the layer of metal is deposited inside the growth control region, and the suppressor comprises chloride, polyethylene glycol (PEG), polypropylene glycol (PPG), polyethyleneimine (PEI), saccharin, ammonium hydroxide, cetyl-trimethyl-ammonium, dimethylglyoxime, cyclohexane dioxime, potassium ferrocyanide, citric acid, tartaric acid, ethylene diamine, ethylene-diamine-tetraacetic acid, or a combination thereof.

6. The system of claim 1, wherein the growth control solution comprises a suppressor, the electrolyte does not include a suppressor, the layer of metal is deposited outside the growth control region, and the suppressor comprises chloride, polyethylene glycol (PEG), polypropylene glycol (PPG), polyethyleneimine (PEI), saccharin, ammonium hydroxide, cetyl-trimethyl-ammonium, dimethylglyoxime, cyclohexane dioxime, potassium ferrocyanide, citric acid, tartaric acid, ethylene diamine, ethylene-diamine-tetraacetic acid, or a combination thereof.

7. The system of claim 1, wherein the electrolyte further comprises a suppressor, the growth control solution comprises an accelerator, the layer of metal is deposited inside the growth control region, and the accelerator comprises KSCN, KSeCN, thiourea (TU), mercapto-bezoaxazole (MBX), benzene sulfinic acid, bis(3-sulfopropyl) disulfide, 2-mercaptoethane-sulfonic acids, 3-mercapto-2-propane sulfonic acid, dimercaptopropionyl sulfonic acid, dimercaptoethane sulfonic acid, or a combination thereof.

8. The system of claim 7, wherein the suppressor comprises chloride, polyethylene glycol (PEG), polypropylene glycol (PPG), polyethyleneimine (PEI), saccharin, ammonium hydroxide, cetyl-trimethyl-ammonium, dimethylglyoxime, cyclohexane dioxime, potassium ferrocyanide, citric acid, tartaric acid, ethylene diamine, ethylene-diamine-tetraacetic acid, or a combination thereof.

9. The system of claim 1, wherein the first metal salt comprises a first metal selected from the group consisting of Cu, Au, Pd, Ag, Fe, Ni, Co, In, and combinations thereof.

10. The system of claim 1, wherein the growth control solution further comprises a second metal salt, and the second metal salt comprises a second metal selected from the group consisting of Cu, Au, Pd, Ag, Fe, Ni, Co, In, and combinations thereof.

11. The system of claim 1, wherein the growth control solution is injected at an injection rate of from 1 picolitre per minute (pL/min) to 1 milliliter per minute (1 mL/min).

12. The system of claim 1, wherein the electrolyte, the growth control solution, or a combination thereof further comprises $Al_2O_3$ nanoparticles, $SiO_2$ nanoparticles, $C_{60}$ nanoparticles, Si nanowires, $SiO_2$ nanowires, ZnO nanowires, carbon nanotubes, graphene, or a combination thereof.

13. The system of claim 1, wherein the system forms the three-dimensional structure at a growth rate of from 0.1 μm/min to 200 μm/min.

14. The system of claim 3, wherein the system further comprises a computing device comprising a processor and memory operably coupled to the processor, the memory having further computer-executable instructions stored thereon that, when executed by the processor, cause the processor to:

transmit an electromagnetic signal to the means for translocating the working electrode;

translocate the working electrode based on the transmitted electromagnetic signal such that the nozzle is configured to inject the growth control solution at a second location proximate the working electrode, thereby generating a second growth control region at a location in the electrolyte proximate to the second location;

such that the system is configured to form a second-three-dimensional structure on a layer-by-layer basis on the working electrode.

15. The system of claim 1, wherein the growth control solution is injected at an injection rate and wherein the system is configured to modulate the injection rate of the growth control solution, the applied electric potential, or a combination thereof during the electrochemical additive manufacturing of the three-dimensional structure such that the three-dimensional structure comprises a first composition and a second composition, wherein the first composition and the second composition are different.

\* \* \* \* \*